(12) United States Patent
McEvoy et al.

(10) Patent No.: US 10,072,682 B2
(45) Date of Patent: Sep. 11, 2018

(54) MULTI-CHAMBER DIAPHRAGM ACTUATOR WITH SYNCHRONIZED SUPPLY SYSTEM

(71) Applicant: GE Oil & Gas Pressure Control LP, Houston, TX (US)

(72) Inventors: Travis Kyle McEvoy, Houston, TX (US); Keith M. Adams, Katy, TX (US); Lloyd Ray Cheatham, Lake Jackson, TX (US); Arianne P. Loeber, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 340 days.

(21) Appl. No.: 14/792,986

(22) Filed: Jul. 7, 2015

(65) Prior Publication Data
US 2017/0009785 A1  Jan. 12, 2017

(51) Int. Cl.
F15B 15/14 (2006.01)
F15B 15/28 (2006.01)
F15B 15/10 (2006.01)
F16K 31/126 (2006.01)
F16K 31/122 (2006.01)

(52) U.S. Cl.
CPC .......... *F15B 15/1404* (2013.01); *F15B 15/10* (2013.01); *F15B 15/149* (2013.01); *F15B 15/1433* (2013.01); *F15B 15/1447* (2013.01); *F15B 15/1476* (2013.01); *F15B 15/28* (2013.01); *F16K 31/1221* (2013.01); *F16K 31/1225* (2013.01); *F16K 31/1226* (2013.01); *F16K 31/1262* (2013.01); *F16K 31/1268* (2013.01)

(58) Field of Classification Search
CPC .... F15B 15/10; F15B 15/149; F15B 15/1404; F15B 15/1447; F16K 31/1225
USPC ................................................... 92/62; 137/1
See application file for complete search history.

(56) References Cited

U.S. PATENT DOCUMENTS

| 3,288,036 A | * | 11/1966 | Fisher ................. F15B 11/0365 92/129 |
| 3,554,088 A | * | 1/1971 | Bruyn .................... B21J 15/105 29/243.523 |
| 4,840,347 A | * | 6/1989 | Ariizumi ............. F16K 31/1221 251/63.4 |
| 4,934,652 A | | 6/1990 | Golden |

(Continued)

*Primary Examiner* — Michael Leslie
*Assistant Examiner* — Richard Drake
(74) *Attorney, Agent, or Firm* — Hogen Lovells US LLP

(57) ABSTRACT

An apparatus for actuating a valve includes a first actuator having a first actuator housing and second actuator with a second actuator housing. A first plate is positioned within the first actuator housing and a second plate is positioned within the second actuator housing. An intermediate stem extends from a first pressure chamber of the first actuator housing to the second plate. A pressure media path extends through the intermediate stem and a second seal nut that extends into the second plate, the pressure media path providing fluid communication between the first pressure chamber, and a second pressure chamber of the second actuator housing. An injection port is open into one of the first pressure chamber and the second pressure chamber. The first plate and the second plate are movable in response to pressure media injected into the injection port, for actuating the valve.

20 Claims, 3 Drawing Sheets

(56) References Cited

U.S. PATENT DOCUMENTS

| | | | | |
|---|---|---|---|---|
| 5,191,825 A * | 3/1993 | Beneteau | ................. | B25D 9/08 |
| | | | | 91/173 |
| 5,924,672 A * | 7/1999 | Crochet | ............. | F16K 31/1221 |
| | | | | 105/377.07 |
| 8,864,102 B2 * | 10/2014 | Gamache | .............. | F16K 31/126 |
| | | | | 251/61.2 |
| 8,998,166 B2 * | 4/2015 | Adams | .................... | F15B 15/10 |
| | | | | 251/335.2 |
| 9,194,509 B2 * | 11/2015 | Adams | ................ | F16K 31/122 |
| 9,422,997 B2 * | 8/2016 | Yeh | ......................... | F16F 9/006 |
| 9,518,673 B2 * | 12/2016 | Tanikawa | ............ | F16K 31/1225 |
| 9,568,117 B2 * | 2/2017 | Adams | ................ | F16K 31/1221 |
| 2005/0139061 A1* | 6/2005 | Timko | ................ | F16K 31/1225 |
| | | | | 91/167 R |
| 2013/0020519 A1 | 1/2013 | Lymberopoulos | | |
| 2013/0181148 A1* | 7/2013 | Tokuda | ............... | F16K 31/1225 |
| | | | | 251/63.6 |
| 2013/0233389 A1* | 9/2013 | Young | ................ | F16K 31/1225 |
| | | | | 137/1 |
| 2013/0234055 A1 | 9/2013 | Young | | |

* cited by examiner

MULTI-CHAMBER DIAPHRAGM ACTUATOR WITH SYNCHRONIZED SUPPLY SYSTEM

BACKGROUND OF THE DISCLOSURE

1. Field of the Disclosure

The present disclosure relates in general to valves for hydrocarbon recovery wells, and in particular to actuators to actuate valves.

2. Description of Related Art

Actuators can be a hydraulic, piston type actuator, or actuators can be a pneumatic piston or diaphragm type actuator. In conventional diaphragm actuators, a diaphragm is moved in response to pressure media, such as gas or other fluids, urging the diaphragm toward a gate valve. The diaphragm is supported by a support plate. When the diaphragm is urged downward with the pressure media, it urges the support plate downward, which then transfers the downward force via a stem to the valve to open or close the valve, as applicable.

Actuators can be secured to different types of valves to move a valve between open and closed positions. As an example, a gate valve is a valve having a body and a bore through the body. A gate is positioned transverse to the body, and moves linearly to obstruct flow through the bore or allow flow through the bore. Some gates have an aperture that aligns with the bore to allow flow. The gate can be normally open, and thus the gate is closed when it is moved linearly to push the aperture out of alignment with the bore. Alternatively, a gate can be normally closed, and thus the gate is opened when it is moved linearly to position the aperture in alignment with the bore. Regardless of whether the gate is normally open or normally closed, the gate is moved, or actuated, by a valve actuator.

When additional force is needed to operate a valve, more than one actuator can be used to operate the valve. However, multiple actuators can take up more space than is available at the site of the valve, and operating more than one actuator at a time can be cumbersome and difficult to coordinate.

SUMMARY OF THE DISCLOSURE

This application discloses embodiments of an actuator assembly that is space saving and efficient, while providing more opening and closing force and greater control than some current valve actuators. Systems and methods of this disclosure also disclose an actuator assembly that is easily resized to meet different valve requirements and provides an internal pressure media flow path for coordinating the action of a dual actuator.

In an embodiment of the current disclosure, an apparatus for actuating a valve includes a first actuator having a first actuator housing with a valve end, an outer end, and a first sidewall defining a first inner diameter of the first actuator housing. A second actuator has a second actuator housing with an inner end, a cap end, and a second sidewall defining a second inner diameter of the second actuator housing. A first plate is positioned within the first actuator housing and a second plate is positioned within the second actuator housing. An intermediate stem extends from a first pressure chamber of the first actuator housing to the second plate. A second seal nut extends into the second plate and engages an end of the intermediate stem. A pressure media path extends through the intermediate stem and the second seal nut, the pressure media path providing fluid communication between the first pressure chamber, and a second pressure chamber of the second actuator housing. An injection port is open into one of the first pressure chamber and the second pressure chamber. The first plate is moveable between a first plate-up position and a first plate-down position in response to pressure media injected into the injection port, and the second plate is movable between a second plate-up position and a second plate-down position in response to pressure media injected into the injection port, for actuating the valve.

In an alternate embodiment of this disclosure, an apparatus for actuating a valve includes a first actuator having a first actuator housing with a valve end, an outer end, a first sidewall defining a first inner diameter of the first actuator housing, and a first plate positioned within the first actuator housing. A second actuator has a second actuator housing with an inner end with an inner end surface, a cap end, a second sidewall defining a second inner diameter of the second actuator housing, and a second plate positioned within the second actuator housing. A cap is connected to the cap end of the second actuator housing. A spring is located within the first actuator. The spring biases the first plate towards a first plate up position and biases the second plate towards a second plate up position. A first pressure chamber is located within the first actuator housing between the first plate and the inner end surface. A second pressure chamber is located within the second actuator housing between the second plate and the cap. An intermediate stem extends from the first pressure chamber of the first actuator housing to the second plate. A second seal nut extends into the second plate and engages an end of the intermediate stem. A pressure media path extends through the intermediate stem and the second seal nut, the pressure media path providing fluid communication between the first pressure chamber, and the second pressure chamber. An injection port opens into one of the first pressure chamber and the second pressure chamber. The first plate is moveable from the first plate-up position towards a first plate-down position in response to pressure media injected into the injection port, and the second plate is movable from the second plate-up position and a second plate-down position in response to pressure media injected into the injection port, for actuating the valve.

In yet another alternate embodiment of this disclosure, a method for actuating a valve includes providing a first actuator. The first actuator has a first actuator housing with a valve end, an outer end, a first sidewall defining a first inner diameter of the first actuator housing, and a first plate positioned within the first actuator housing. A second actuator is releasably secured to the first actuator. The second actuator has a second actuator housing with an inner end, a cap end, a second sidewall defining a second inner diameter of the second actuator housing, a second plate positioned within the second actuator housing, an intermediate stem extending from a first pressure chamber of the first actuator housing to the second plate, and a second seal nut extending into the second plate and engaging an end of the intermediate stem. A pressure media is injected into an injection port that is open into one of the first pressure chamber and the second pressure chamber, the pressure media traveling along a pressure media path that extends through the intermediate stem and the second seal nut, the pressure media path providing fluid communication between the first pressure chamber, and a second pressure chamber of the second actuator housing so that the first plate moves from a first plate-up position towards a first plate-down position in response to the pressure media injected into the injection port, and the second plate moves from a second plate-up position towards a second plate-down position in response to the pressure media injected into the injection port, for actuating the valve.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE DISCLOSURE

The system and method of the present disclosure will now be described more fully hereinafter with reference to the accompanying drawings which illustrate embodiments of the invention. The system and method if this disclosure may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
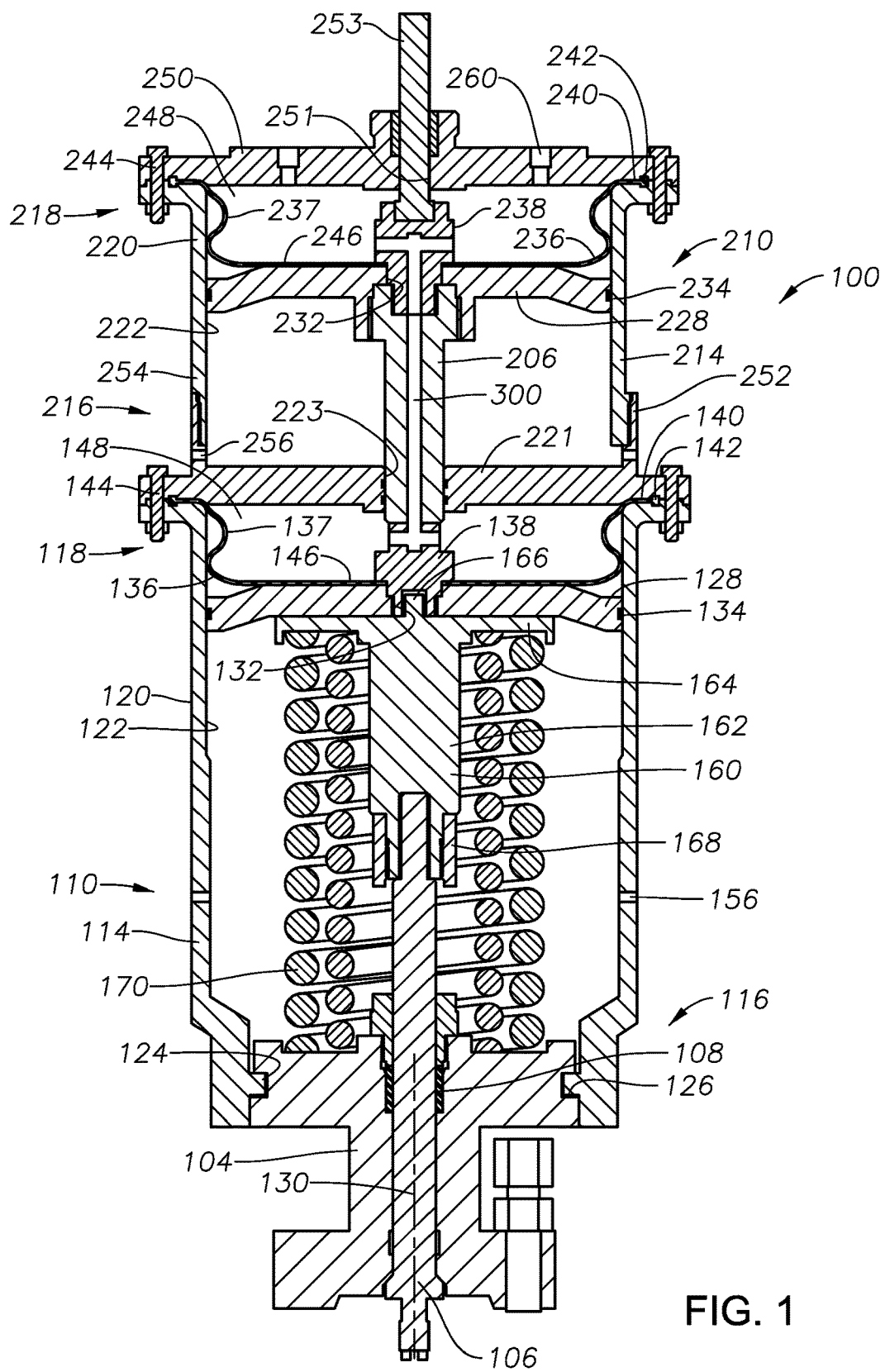
FIG. 1 is a section view of an actuator assembly in accordance with an embodiment of this disclosure, the left side showing an example second actuator with a constant inner diameter and the right side showing an example second actuator with a different inner diameter.

Referring to FIG. 1, actuator assembly 100 is shown. Actuator assembly 100 is used to open or close a valve, to which actuator assembly 100 is connected. As one of skill in the art will appreciate, the valve can be a gate valve or any other type of valve that is actuated by the extension of a linear member. The valve can be, for example associated with a wellhead assembly that is disposed over a well. The wellhead assembly can include a wellhead housing, a production tree over the housing and flow lines connected to the tree or the wellhead assembly. The flow lines and wellhead assembly can include embodiments of the valve described herein. The valve can also be used for regulating fluids that are designated for entry into the wellhead assembly. The valve can be used in high temperature, low temperature or otherwise harsh environments. Bonnet 104 is connected to the body of the valve. Valve stem 106 passes through bonnet 104 and packing assembly 108. Actuator assembly 100 is used to actuate the valve by urging valve stem 106 downward toward the valve. Bonnet 104 and the valve 102 are sealed to prevent the flow of fluid from the valve to actuator assembly 100.

Actuator assembly 100 includes first actuator 110 and second actuator 210. First actuator 110 has first actuator housing 114 with valve end 116, outer end 118, and first sidewall 120 that defines first inner diameter 122 of first actuator housing 114. First actuator housing 114 can have a generally cylindrical first sidewall 120 and can be manufactured from any of a variety of techniques including, for example, stamping, extrusion, and casting. In embodiments, first actuator housing 114 is free of welds or seams on the interior surfaces. First actuator housing 114 can be manufactured from NACE certified materials.

In the embodiment of FIG. 1, valve end 116 of first actuator housing 114 is connected to bonnet 104 by way of housing lugs 124 that protrude inward and engage bonnet groove 126. In alternate embodiments, valve end 116 of first actuator housing 114 is connected to bonnet 104 by way of threaded connection, bolts, or other known connection means. As one of skill in the art will appreciate, no fluid from the valve will pass by packing assembly 108 and, thus, there can be an absence of seals between valve end 116 of first actuator housing 114 and the upper end of bonnet 104.

First plate 128 is positioned within first actuator housing 114. First plate 128 is an annular shaped member that is positioned generally perpendicular to central axis 130 of first actuator housing 114. First plate 128 can span the inner diameter of first actuator housing 114 and slidingly or sealingly engage first inner diameter 122 of first actuator housing 114. First plate 128 includes first central bore 132. The upward facing surface of first plate 128 is the pressure side of first plate 128. First plate 128 can be a single, monolithic plate, as shown, or can include a hub that is releasably secure to an outer plate. First central bore 132, has inner diameter threads on an inner diameter surface of first central bore 132.

The upper surface of first plate 128 can slope downward and outward and then extend generally horizontally to first inner diameter 122. In other embodiments, the upper surface of first plate 128 can slope upward and outward before extending generally horizontally to first inner diameter 122, or can be a flat surface, or can have an alternative shape of a combination sloped and flat portions. As shown in the example embodiment of FIG. 1, the outer diameter region of first plate 128 can be located axially nearer valve end 116 of first actuator housing 114 than the central portion of first plate 128.

First sidewall seal 134 is positioned in a groove located on an outer diameter of first plate 128 and sealingly engages first inner diameter 122 of first actuator housing 114 to provide a dynamic seal between first inner diameter 122 and first plate 128. In embodiments, a wear ring (not shown) can be positioned in the groove. As one of skill in the art will appreciate, a wear ring will reduce the friction between the outer diameter of first plate 128 and first inner diameter 122. The wear ring does not have the same sealing properties as first sidewall seal 134.

Figure 2:
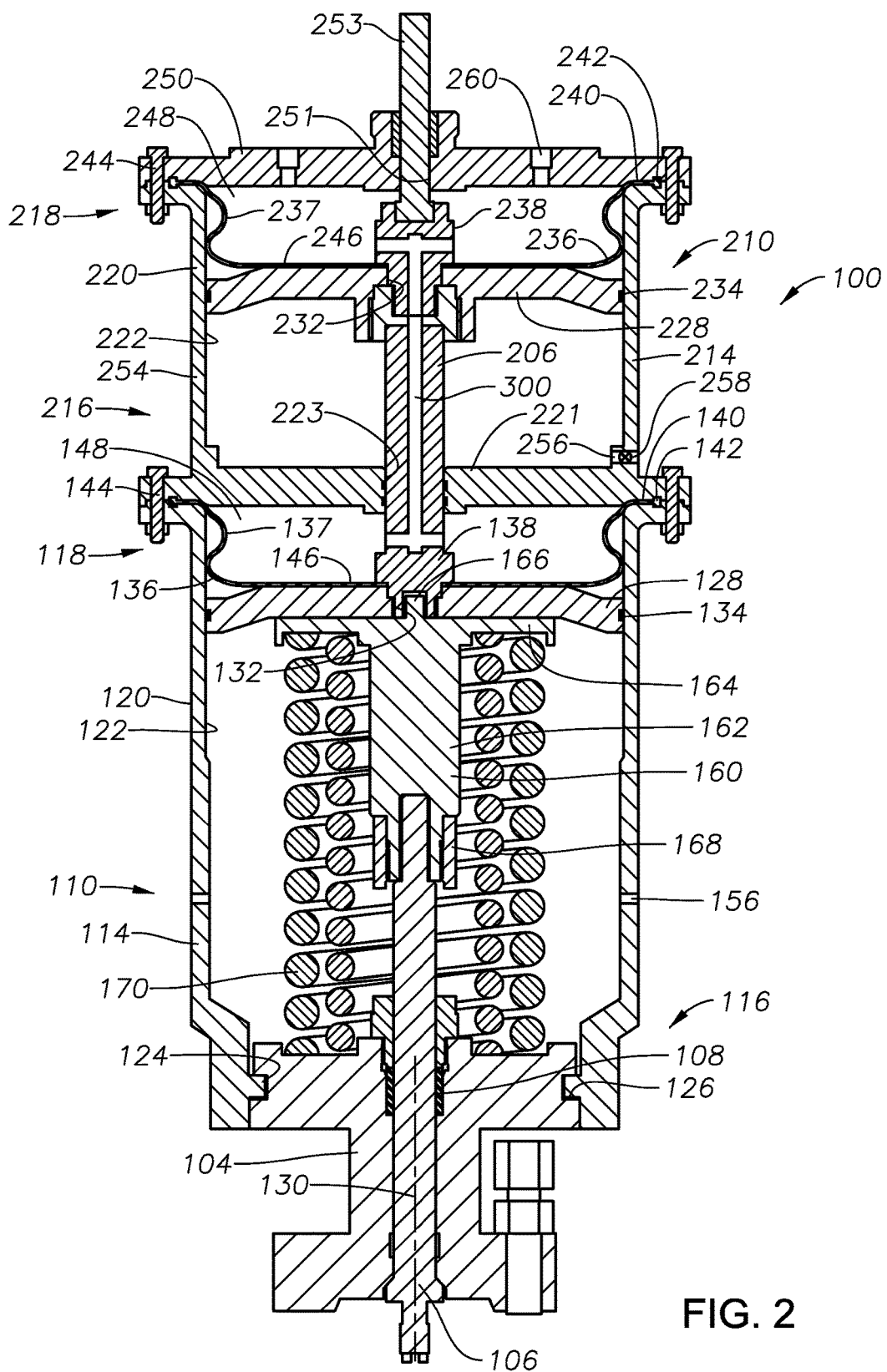
FIG. 2 is a section view of an actuator assembly in accordance with an embodiment of this disclosure.
Figure 3:
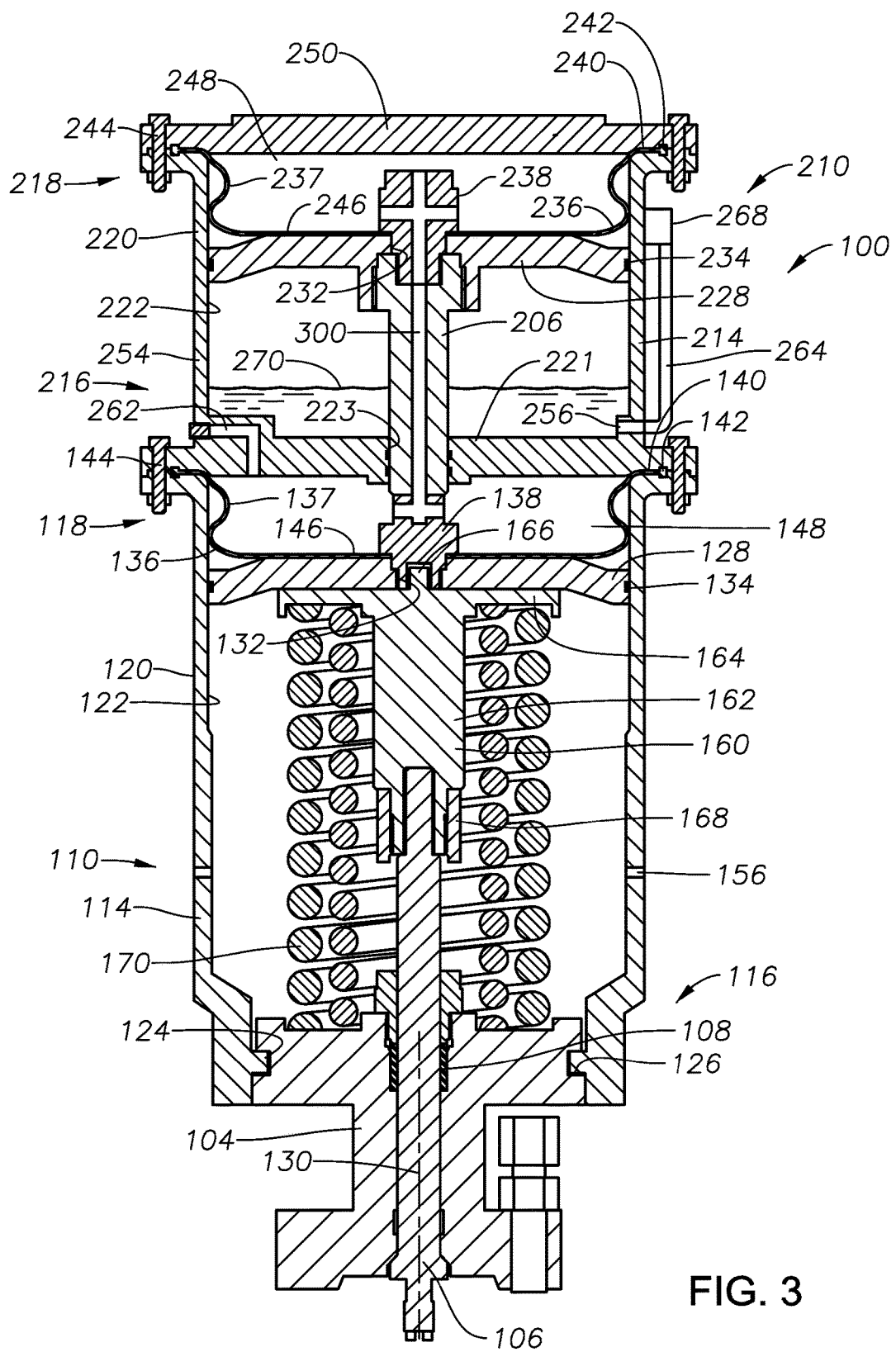
FIG. 3 is a section view of an actuator assembly in accordance with an embodiment of this disclosure.

First diaphragm 136 can also be located within first actuator housing 114. First diaphragm 136 is a flexible diaphragm extending at least from first inner diameter 122 to first seal nut 138. First diaphragm 136 can be formed of, for example, a nitrile rubber or silicone. First diaphragm 136 is located between first plate 128 and outer end 118 of first actuator 110. First diaphragm 136 can be formed so that in a relaxed state, first diaphragm 136 is shaped as shown in FIGS. 1-3, with folds in first body portion 137. First diaphragm 136 may not stretch or balloon, as first plate 128 moves between a first plate-up position (FIGS. 1-3) and a first plate-down position. In this context, stretching and ballooning refers to conditions in which the material of first diaphragm 136 would decrease in thickness, or thin, due to an increase in surface area of the material. First diaphragm 136 moves between the relaxed position (FIGS. 1-3) and an extended position by straightening the folds to expand the bellows shape of first diaphragm 136 and extend and lengthen axially. In an alternate embodiment, first diaphragm 136 can be a less rigid member so that the folds can be formed at any location around first diaphragm 136, such as in the bottom surface of first diaphragm 136. In such an embodiment, first diaphragm 136 may not retain a single particular shape in a relaxed state.

At an upper end of first diaphragm 136 is first top ring 140. First top ring 140 is annular shaped and extends radially outward from first body portion 137. First top ring 140 extends radially outward past the outermost radial diameter of the folds. First diaphragm 136 includes first seal lip 142 that is on an outer edge of first top ring 140. In certain embodiments, first top ring 140 can have holes through which connecting members, such as bolts, will extend. In alternate embodiments, such as shown in FIGS. 1-3, first top ring 140 can be free of holes and first actuator 110 second actuator 210 can be secured together by a connecting means 144 that are radially outward from first top ring 140.

At an end of first body portion 137 of first diaphragm 136 opposite from first top ring 140 is first bottom 146 of first diaphragm 136. First bottom 146 is generally disk shaped and extends inward from first body portion 137. First bottom 146 has a first central opening centered on the central axis 130. A first opening lip can circumscribe the central opening and can include an upper opening lip that protrudes upward or a lower opening lip that protrudes downward, or both the upper opening lip and lower opening lip.

First seal nut 138 is detachably connected to the center of first plate 128. First seal nut 138 includes a cylindrical body with threads on an outer diameter of the cylindrical body that can threadingly engage the inner diameter threads on an inner diameter surface of first central bore 132 of first plate 128. First seal nut 138 can also include a first seal nut seal that is positioned in a seal groove on an outer diameter surface of the cylindrical body axially above the threads, to sealingly engage first central bore 132 of first plate 128. As first seal nut 138 is threaded into first central bore 132 of first plate 128, a downward facing lip of first seal nut 138 can trap the opening lip of first diaphragm 136 to form a seal between first diaphragm 136 and first seal nut 138 and to retain first diaphragm 136 in position by resisting radial movement of first diaphragm 136 relative to first plate 128.

In alternate embodiments, first diaphragm 136 is free of the opening lip. In such an embodiment, first bottom 146 of first diaphragm 136 circumscribing the central opening is positioned between a shoulder of first seal nut 138 and first plate 128. As first seal nut 138 is threaded into first central bore 132 of first plate 128, a portion of first bottom 146 of first diaphragm 136 is compressed between first plate 128 and the shoulder of first seal nut 138 to form a seal. In yet other alternate embodiments, first diaphragm 136 may not have a central opening and there may be no first seal nut 138. In still other embodiments, there may be no first diaphragm 136 and no first seal nut 138. In such embodiments, first plate 128 may be free of a central opening. First seal nut 138 can, in some embodiments, provide no sealing features or functions itself but instead simply be secured to or associated with first plate 128.

Down stop 160 can be located within first actuator housing 114. Down stop 160 can transmit axial force between first plate 128 and valve stem 106. Down stop 160 includes cylindrical body 162 and shoulder 164 extending therefrom at an outer end of down stop 160. The upward facing surface of shoulder 164 contacts the downward facing surface of first plate 128. Nipple 166 extends axially from the upper end of down stop 160. When actuator assembly 100 is assembled, nipple 166 can be positioned within a cavity of first seal nut 138 to concentrically align both members.

Down stop 160 is releasably secured to valve stem 106 of the valve for moving the valve between an open position and a closed position. The inner end of down stop 160 can include a threaded bore for threadingly engaging a threaded end of valve stem 106. As one of skill in the art will appreciate, the connection between down stop 160 and valve stem 106 can be any of various types of connections and is not limited to threaded connections. The outer diameter of the lower end of down stop 160 includes threaded collar 168 and can include any number of spacer rings. Threaded collar 168 contacts another member, such as the packing retainer of packing assembly 108, to stop the further downward travel of down stop 160. Threaded collar 168 is adjusted so that it stops downward movement of down stop 160 to limit the stroke of the valve, and can therefore limit the linear movement of valve stem 106 at the appropriate position to completely open or completely close the valve.

One or more springs 170 surround down stop 160 and at least a portion of valve stem 106, and generally extends from the top of bonnet 104 to the downward facing surface of shoulder 164. Spring 170 is compressed as first plate 128 moves from the plate-up position to the plate-down position. Spring 170 urges first plate 128 to a first plate-up position, away from the valve, and therefore biases down stop 160 towards outer end 118 of first actuator housing 114. Spring 170 can be selected to provide sufficient closing force to cut through a wire, cable or a tubular member that passes through the valve as the valve is moving to a closed position. Spring 170 can also be selected to provide a high speed closing of the valve. In the example of FIGS. 1-3, two springs 170 are shown. In alternate embodiments, one spring 170 can be used.

Second actuator 210 includes many of the same features as first actuator 110. Second actuator 210 has second actuator housing 214 with inner end 216, cap end 218, and second sidewall 220 that defines second inner diameter 222 of second actuator housing 214. Second actuator housing 214 can have a generally cylindrical second sidewall 220 and can be manufactured from any of a variety of techniques including, for example, stamping, extrusion, and casting. In embodiments, second actuator housing 214 is free of welds or seams on the interior surfaces and can be manufactured from NACE certified materials. In the example embodiments of FIGS. 2-3, first inner diameter 122 of first actuator housing 114 is substantially similar to second inner diameter 22 of second actuator housing 214. In alternate embodiments (FIG. 1, right side), first inner diameter 122 of first actuator housing 114 can be greater or less than second inner diameter 22 of second actuator housing 214.

Second actuator 210 can also include inner end surface 221. Inner end surface 221 is a generally disk shaped plate that extends across inner end 216 of second actuator housing 214 and has an end opening 223 centered along central axis 130 that extends through inner end surface 221.

In the embodiment of FIGS. 1-3, inner end 216 of second actuator housing 214 is releasably connected to outer end 118 of first actuator 110 by way of connecting means 144. Connecting means 144 are shown as bolts, however in alternate embodiments, connecting means 144 can instead be other known connection means known in the art.

Second plate 228 is positioned within second actuator housing 214. Second plate 228 is an annular shaped member that is positioned generally perpendicular to central axis 130 of second actuator housing 214. Second plate 228 can span the inner diameter of second actuator housing 214 and slidingly or sealingly engage second inner diameter 222 of second actuator housing 214. Second plate 228 includes a second central bore 232. The upward facing surface of second plate 228 is the pressure side of second plate 228. Second central bore 232, has inner diameter threads on an inner diameter surface of second central bore 232. Second plate 228 can be shaped and formed in a similar manner as first plate 128.

Second sidewall seal 234 is positioned in a groove located on an outer diameter of second plate 228 and sealingly engages second inner diameter 222 of second actuator housing 214 to provide a dynamic seal between second inner diameter 222 and second plate 228. In embodiments, a wear ring (not shown) can be positioned in the groove. As one of skill in the art will appreciate, a wear ring will reduce the friction between the outer diameter of second plate 228 and second inner diameter 222. The wear ring does not have the same sealing properties as second sidewall seal 234.

Second diaphragm 236 can also be located within second actuator housing 214. Second diaphragm 236 can be shaped and formed in a manner similar to first diaphragm 136 and include second body portion 237, second top ring 240, second seal lip 242, and second bottom 246. Second diaphragm 236 is located between second plate 228 and cap end 218 of second actuator housing 214. In certain embodiments, second top ring 240 can have holes through which connecting members, such as bolts, will extend. In alternate embodiments, such as shown in FIGS. 1-3, second top ring 240 can be free of holes and cap 250 can be secured to cap end 218 of second actuator housing 214 by cap connectors 244 that are radially outward from second top ring 240. A second opening lip can circumscribe the central opening of second diaphragm 236 and can include an upper opening lip that protrudes upward or a lower opening lip that protrudes downward, or both the upper opening lip and lower opening lip.

Second seal nut 238 is detachably connected to the center of second plate 228. Second seal nut 238 includes a cylindrical body with threads on an outer diameter of the cylindrical body that can threadingly engage the inner diameter threads on an inner diameter surface of second central bore 232 of second plate 228. Second seal nut 238 can also include a seal that is positioned in a seal groove on an outer diameter surface of the cylindrical body axially above the threads, to sealingly engage second central bore 232 of second plate 228. As second seal nut 238 is threaded into second central bore 232 of second plate 228, a downward facing lip of second seal nut 238 can trap the opening lip of second diaphragm 236 to form a seal between second diaphragm 236 and second seal nut 238 and to retain second diaphragm 236 in position by resisting radial movement of second diaphragm 236 relative to second plate 228.

In alternate embodiments, second diaphragm 236 is free of the opening lip. In such an embodiment, second bottom 246 of second diaphragm 236 circumscribing the central opening is positioned between a shoulder of second seal nut 238 and second plate 228. As second seal nut 238 is threaded into second central bore 232 of second plate 228, a portion of second bottom 246 of second diaphragm 236 is compressed between second plate 228 and the shoulder of second seal nut 238 to form a seal. In yet other alternate embodiments, second diaphragm 236 may not have a central opening and there may be no second seal nut 238. In still other embodiments, there may be no second diaphragm 236 and no second seal nut 238. In such embodiments, second plate 228 may be free of a central opening. Second seal nut 238 can, in some embodiments, provide no sealing features or functions itself but instead simply be secured to or associated with second plate 228.

Intermediate stem 206 extends through end opening 223. Intermediate stem 206 can have a first end that is separate from first seal nut 138, and can engage first seal nut 138 (FIGS. 1 and 3). Alternately, intermediate stem 206 can be integrally formed with first seal nut 138 (FIG. 2). The second end of intermediate stem 206 can be releasably secured to both second plate 228 and second seal nut 238. Intermediate stem 206 can transmit axial force between second plate 228 and first plate 128.

In the example embodiment of FIG. 1, second actuator housing 214 includes base housing portion 252 that is threadingly connected to main housing portion 254 so that main housing portion 254 can be released from actuator assembly 100 while outer end 118 of first actuator housing 114 remains secured to inner end 216 of second actuator housing 214. This can facilitate a straightforward replacement of main housing portion 254 to accommodate different or varying actuator requirements. For example, as can be seen on the left side of FIG. 1, the innermost diameter of base housing portion 252 is substantially similar to the innermost diameter of main housing portion 254. If an operator desires to change the size of second actuator 210, main housing portion 254 can be rotated relative to base housing portion 252 to remove main housing portion 254. A main housing portion 254 with a different innermost diameter, as shown on the right side of FIG. 1, can then be threadingly secured to base housing portion 252, where the innermost diameter of base housing portion 252 is substantially different than the innermost diameter of main housing portion 254. Alternately, if an operator desires to have only a single actuator, second actuator 210 can be removed and replaced with a cap.

In the embodiments of FIGS. 1-2, cap 250 can include cap opening 251 that extends through cap 250 along central axis 130. Indicator stem 253 can have an end that is releasably secured to second seal nut 238 and can extend through cap opening 251. In alternate embodiments, indicator stem 253 can be integrally formed with second seal nut 238. In the alternate embodiment of FIG. 3, cap 250 does not have an opening but is instead a solid member and there is no indicator stem 253. This embodiment will allow for use of actuator assembly 100 in locations that require a limited operating length of actuator assembly along central axis 130.

First actuator 110 can include first pressure chamber 148 and second actuator 210 can include second pressure chamber 248. First pressure chamber 148 is located within first actuator housing 114 between first plate 128 and inner end surface 221 of second actuator 210. First pressure chamber 148 will be sealed between inner end surface 221 and outer end 118 of first actuator housing 114. In the example of FIGS. 1-3, first seal lip 142 is retained between inner end surface 221 and outer end 118 of first actuator housing 114 to form such a seal. In alternate embodiments with no first diaphragm 136, an o-ring or other known sealing means can be used to seal between inner end surface 221 and outer end 118 of first actuator housing 114. First pressure chamber 148 is also sealed at first plate 128. In the example embodiments of FIGS. 1-3, first pressure chamber 148 is sealed between first seal nut 138 and first plate 128 by a portion of first bottom 146 of first diaphragm 136 being trapped or otherwise engaged by first seal nut 138. In alternate embodiments with no first diaphragm 136, or where first diaphragm 136 has been damaged, first sidewall seal 134 sealingly engages first inner diameter 122 of first actuator housing 114 and either first diaphragm 136 or the first seal nut seal can seal between first seal nut 138 and first plate 128.

Second pressure chamber 248 is located within second actuator housing 214 between second plate 228 and cap 250. Second pressure chamber 248 will be sealed between cap 250 and cap end 218 of second actuator housing 214. In the example of FIGS. 1-3, second seal lip 242 is retained between cap 250 and cap end 218 of second actuator housing 214 to form such a seal. In alternate embodiments with no second diaphragm 236, an o-ring or other known sealing means can be used to seal between cap 250 and cap end 218 of second actuator housing 214. Second pressure chamber 248 is also sealed at second plate 228. In the example embodiments of FIGS. 1-3, second pressure chamber 248 is sealed between second seal nut 238 and second plate 228 by a portion of second bottom 246 of second diaphragm 236 being trapped or otherwise engaged by second seal nut 238. In alternate embodiments with no second diaphragm 236, or where second diaphragm 236 has been damaged, second sidewall seal 234 sealingly engages second inner diameter 222 of second actuator housing 214 and either second diaphragm 236 or the second seal nut seal can seal between second seal nut 238 and second plate 228.

Actuator assembly 100 also includes an injection port that is open into either first pressure chamber 148 or second pressure chamber 248. In the example embodiment of FIGS. 1-2, injection port 260 extends through cap 250 and opens into second pressure chamber 248. In the example embodiment of FIG. 3, injection port 262 extends through second actuator housing 214 and opens into first pressure chamber 148. Injection port 262 can pass through both second sidewall 220 and inner end surface 221 to reach first pressure chamber 148.

Pressure media that is injected into first pressure chamber 148 can travel through pressure media path 300 to reach second pressure chamber 248 and pressure media that is injected into second pressure chamber 248 can travel through pressure media path 300 to reach first pressure chamber 148. Pressure media is typically a fluid such as compressed air, nitrogen, well gas, or other types of gas or liquid.

Pressure media path 300 extends through intermediate stem 206 and second seal nut 238 and provides fluid communication between first pressure chamber 148 and second pressure chamber 248. In the example embodiments of FIGS. 1 and 3 where intermediate stem 206 is a separate member from first seal nut 138, there may be times when intermediate stem 206 is not engaging first seal nut 138, such as when first plate 128 is in a first plate-down position and second plate 228 is in a second plate-up position. In such an example, pressure media can enter and exit intermediate stem 206 directly from first pressure chamber 148. Regardless of whether second plate 228 is in second plate-up position or second plate-down position, intermediate stem 206 will extend from first pressure chamber 148 to second plate 228.

In the example of FIG. 2 where intermediate stem 206 is integrally formed with first seal nut 138 and in the example of FIGS. 1 and 3 where the end of intermediate stem 206 engages first seal nut 138, pressure media path 300 will also extend through first seal nut 138. In each of the disclosed embodiments, pressure media will travel between first pressure chamber 148 and second pressure chamber 248 while remaining within first actuator housing 114 and second actuator housing 214 so that no external pressure media lines are required.

Pressure media injected through either injection port 260, 262 into first pressure chamber 148 and second pressure chamber 248 will cause first plate 128 to move from the first plate-up position, closer to outer end 118 of first actuator housing 114 towards the first plate-down position, closer to valve end 116. Pressure media injected through either injection port 260, 262 into first pressure chamber 148 and second pressure chamber 248 will also cause second plate 228 to move from the second plate-up position, closer to cap end 218, to the second plate-down position, closer to inner end 216.

First actuator 110 can include first outlet port 156. First outlet port 156 can extend through first actuator housing 114 outside of first pressure chamber 148. First outlet port 156 can allow fluid that is located within first actuator housing 114 outside of first pressure chamber 148 to vent out of first actuator housing 114 as pressure media is being injected into first pressure chamber 148. Second actuator 210 can include second outlet port 256. Second outlet port 256 can extend through second actuator housing 214 outside of second pressure chamber 248. Second outlet port 256 can allow fluid that is located within second actuator housing 214 outside of second pressure chamber 248 to vent out of second actuator housing 214 as pressure media is being injected into second pressure chamber 248. Second outlet port 256 can include a choke 258 (FIG. 2) for controlling the flow of fluid out of second actuator housing 214. Choke 258 can be used to prevent valve stem 106 from moving too rapidly and causing the valve to slam while being actuated by actuator assembly 100.

In alternate embodiments, indicator tube 264 can be in fluid communication with second outlet port 256, as shown in FIG. 3. Indicator tube 264 can be a transparent tubular member that extends outside of second actuator 210 from second outlet port 256 to pressure transducer 268. In such an embodiment, if central axis 130 is vertically oriented, non-Newtonian fluid 270 can be located within second actuator housing 214 outside of second pressure 248 and between second plate 228 and inner end surface 221. If central axis 130 is horizontally oriented, such as when actuator assembly 100 extends horizontally from a valve, non-Newtonian fluid 270 can instead be located within an accumulator.

As pressure media is injected through one of the injection ports 260, 262 and second plate 228 moves towards the second plate-down position, non-Newtonian fluid 270 can dampen the impact energy of the initial downward thrust of second plate 228 by shear hardening, and prevent slamming of the valve. Once the impact energy has been dissipated, non-Newtonian fluid 270 can recover from its shear hardened state and allow second plate 228 to continue to travel towards the second plate-down position.

Non-Newtonian fluid 270 is displaced as second plate 228 to continue to travel towards the second plate-down position by flowing into indicator tube 264. Indicator tube 264 can provide a visual indication of the location of second plate 228, which in turn can be correlated to the position of valve stem 106 and therefore of the valve. Non-Newtonian fluid 270 can be a brightly colored fluid, a luminescent fluid, or may be illuminated by a light source so that an operator can more easily determine the level of non-Newtonian fluid within indicator tube 264. Pressure transducer 268 can sense and display or transmit a pressure reading from within indicator tube 264.

In an example of operation, actuator assembly 100 can be secured to a valve for actuating the valve. Spring 170 will bias first plate 128 towards the first plate-up position. Because axial forces can be transmitted from first plate 128, through first seal nut 138, and intermediate stem 206 to second plate 228, spring 170 will also bias second plate 228 towards the second plate-up position.

In the example embodiments of FIGS. 1 and 2, in order to actuate the valve, pressure media can be injected into injection port 260 through cap 250 and into second pressure chamber 248. Pressure media in second pressure chamber 248 will exert a downward force on second diaphragm 246 and second plate 228, urging second plate 228 towards a second plate-down position. As second plate 228 moves towards a second plate-down position, intermediate stem 206 can apply an axial force on first seal nut 138 and first plate 128, causing first plate 128 to also move towards a first plate-down position.

Pressure media can also travel by way of pressure media path 300 from second pressure chamber 248 into first pressure chamber 148. Pressure media in first pressure chamber 148 can exert a downward force on first diaphragm 146 and first plate 128, urging first plate 128 towards a first plate-down position. In the example of FIG. 2 where intermediate stem 206 is integrally formed with first seal nut 138, as first plate 128 moves towards a second plate-down position, intermediate stem 206 can apply an axial force on second seal nut 238 and second plate 228, causing second plate 228 to also move towards a second plate-down position.

In the example embodiment of FIG. 3, in order to actuate the valve, pressure media can be injected into injection port 262 and into first pressure chamber 148. Pressure media in first pressure chamber 148 can exert a downward force on first diaphragm 146 and first plate 128, urging first plate 128 towards a first plate-down position. If intermediate stem 206 is integrally formed with first seal nut 138 (FIG. 2), as first plate 128 moves towards a second plate-down position, intermediate stem 206 can apply an axial force on second seal nut 238 and second plate 228, causing second plate 228 to also move towards a second plate-down position.

Pressure media can also travel by way of pressure media path 300 from first pressure chamber 148 into second pressure chamber 248. Pressure media in second pressure chamber 248 will exert a downward force on second diaphragm 246 and second plate 228, urging second plate 228 towards a second plate-down position. As second plate 228 moves towards a second plate-down position, intermediate stem 206 can apply an axial force on first seal nut 138 and first plate 128, causing first plate 128 to also move towards a first plate-down position.

As second plate 228 moves towards a second plate-down position, fluid within second actuator housing between second plate 228 and inner end surface 221 can escape through second outlet port 256. The operator can control choke 258 (FIG. 2) located within second outlet port 256 to control the speed of second plate 228. In the example of FIG. 2 where intermediate stem 206 is integrally formed with first seal nut 138, controlling the speed of second plate 228 will also control the speed of first plate 128 as first plate 128 can be axially fixed to second plate 228 during operations. In embodiments where intermediate stem 206 is a separate member from first seal nut 138 (FIG. 3), the speed of second plate 228 can be controlled separately from the speed of first plate 128. If choke 258 is used to limit the exit of fluid though second outlet port 256 and slow the speed of second plate 228, pressure media can still pass through pressure media path 300 and urge first plate 128 towards a first plate-down position. If first plate 128 travels faster than second plate 228, intermediate stem 206 will separate from first seal nut 138 and pressure media within second pressure chamber 248 will no longer be applying an axial force on first plate 128 by way of intermediate stem 206. If first plate 128 travels faster than second plate 228, this can also slow down the movement of valve stem 106 as only a single actuator will be acting to move the valve.

Alternately, as pressure media is injected through one of the injection ports 260, 262 and second plate 228 moves towards the second plate-down position, non-Newtonian fluid 270 can dampen the impact energy of the initial downward thrust of second plate 228 by shear hardening, and prevent slamming of the valve. The operator can monitor the level of non-Newtonian fluid within indicator tube 264 to determine the location of second plate 228 over time.

In order to close the valve, the pressure of pressure media within first pressure chamber 148 and second pressure chamber 248 can be sufficiently reduced so that spring 170 will move first plate 128 and second plate 228 back to the first plate-up and second plate-up positions, respectively.

The terms "vertical", "horizontal", "upward", "downward", "above", and "below" and similar spatial relation terminology are used herein only for convenience because elements of the current disclosure may be installed in various relative positions.

While the invention has been shown or described in only some of its forms, it should be apparent to those skilled in the art that it is not so limited, but is susceptible to various changes without departing from the scope of the invention.

What is claimed is:

1. An apparatus for actuating a valve, the apparatus comprising:
   a first actuator having a first actuator housing with a valve end, an outer end, and a first sidewall defining a first inner diameter of the first actuator housing;
   a second actuator having a second actuator housing with an inner end, a cap end, and a second sidewall defining a second inner diameter of the second actuator housing;
   a first plate positioned within the first actuator housing and a second plate positioned within the second actuator housing;
   an intermediate stem extending from a first pressure chamber of the first actuator housing to the second plate;
   a second seal nut extending into the second plate and engaging an end of the intermediate stem;
   a pressure media path extending through the intermediate stem and the second seal nut, the pressure media path providing fluid communication between the first pressure chamber, and a second pressure chamber of the second actuator housing;
   an injection port open into one of the first pressure chamber and the second pressure chamber; and wherein the first plate is moveable between a first plate-up position and a first plate-down position in response to a pressure media injected into the injection port, and the second plate is movable between a second plate-up position and a second plate-down position in response to the pressure media injected into the injection port, for actuating the valve;
   a second outlet port, the second outlet port extending through the second actuator housing outside of the second pressure chamber;
   a non-Newtonian fluid located within the second actuator housing outside of the pressure chamber; and
   an indicator tube in fluid communication with the second outlet port and located outside of the second actuator, the indicator tube providing a fluid flow path for the non-Newtonian fluid as the second plate moves towards the second plate-down position.

2. The apparatus according to claim 1, wherein the first inner diameter of the first actuator housing is substantially similar to the second inner diameter of the second actuator housing.

3. The apparatus according to claim 1, wherein the first inner diameter of the first actuator housing is greater than the second inner diameter of the second actuator housing.

4. The apparatus according to claim 1, further comprising a first seal nut extending into the first plate, the first seal nut including a portion of the pressure media path.

5. The apparatus according to claim 4, wherein the first seal nut is integrally formed with the intermediate stem.

6. The apparatus according to claim 1, further comprising a down stop located within the first actuator housing, the down stop having an outer end engaging a surface of the first plate and having a length selected to limit a stroke of the valve.

7. The apparatus according to claim 6, wherein the down stop is releasably secured to a valve stem of the valve for moving the valve between an open position and a closed position.

8. The apparatus according to claim 6, further comprising a spring that engages the down stop, biasing the down stop towards the outer end of the first actuator housing.

9. The apparatus according to claim 1, wherein the injection port extends through a cap connected to the cap end of the second actuator housing, and opens into the second pressure chamber.

10. The apparatus according to claim 1, wherein the injection port extends through the second actuator housing and opens into the first pressure chamber.

11. The apparatus according to claim 1, wherein the outer end of the first actuator is releasably secured to the inner end of the second actuator, and wherein the second actuator housing includes a base housing portion that is threadingly connected to a main housing portion so that the main housing portion can be released from the apparatus while the outer end of the first actuator remains secured to the inner end of the second actuator.

12. The apparatus according to claim 11, wherein an innermost diameter of the base housing portion is substantially different than an innermost diameter of the main housing portion.

13. The apparatus according to claim 1, further comprising a second outlet port, the second outlet port extending through the second actuator housing outside of the second pressure chamber for venting fluid out of the second actuator housing as the pressure media is injected into the second pressure chamber, the second outlet port including a choke for controlling a flow of fluid out of the second actuator housing.

14. An apparatus for actuating a valve, the apparatus comprising:
a first actuator having a first actuator housing with a valve end, an outer end, a first sidewall defining a first inner diameter of the first actuator housing, and a first plate positioned within the first actuator housing;
a second actuator having a second actuator housing with an inner end with an inner end surface, a cap end, a second sidewall defining a second inner diameter of the second actuator housing, and a second plate positioned within the second actuator housing;
a cap connected to the cap end of the second actuator housing;
a spring located within the first actuator and biasing the first plate towards a first plate up position and biasing the second plate towards a second plate up position;
a first pressure chamber located within the first actuator housing between the first plate and the inner end surface;
a second pressure chamber located within the second actuator housing between the second plate and the cap;
an intermediate stem extending from the first pressure chamber of the first actuator housing to the second plate;
a second seal nut extending into the second plate and engaging an end of the intermediate stem;
a pressure media path extending through the intermediate stem and the second seal nut, the pressure media path providing fluid communication between the first pressure chamber, and the second pressure chamber;
an injection port open into one of the first pressure chamber and the second pressure chamber; and wherein
the first plate is moveable from a first plate-up position towards a first plate-down position in response to a pressure media injected into the injection port, and the second plate is movable from a second plate-up position and a second plate-down position in response to the pressure media injected into the injection port, for actuating the valve;
a second outlet port, the second outlet port extending through the second actuator housing outside of the second pressure chamber;
a non-Newtonian fluid located within the second actuator housing outside of the pressure chamber; and
an indicator tube in fluid communication with the second outlet port and located outside of the second actuator, the indicator tube providing a fluid flow path for the non-Newtonian fluid as the second plate moves towards the second plate-down position.

15. The apparatus according to claim 14, further comprising a first seal nut extending into the first plate, the first seal nut including a portion of the pressure media path.

16. The apparatus according to claim 14, wherein the injection port extends through the cap and opens into the second pressure chamber.

17. The apparatus according to claim 14, wherein the injection port extends through the second actuator housing and opens into the first pressure chamber.

18. A method for actuating a valve, the method comprising:
providing a first actuator having a first actuator housing with a valve end, an outer end, a first sidewall defining a first inner diameter of the first actuator housing, and a first plate positioned within the first actuator housing;
releasably securing a second actuator to the first actuator, the second actuator having a second actuator housing with an inner end, a cap end, a second sidewall defining a second inner diameter of the second actuator housing, a second plate positioned within the second actuator housing, an intermediate stem extending from a first pressure chamber of the first actuator housing to the second plate, and a second seal nut extending into the second plate and engaging an end of the intermediate stem;
injecting a pressure media into an injection port that is open into one of the first pressure chamber and a second pressure chamber of the second actuator housing, the pressure media traveling along a pressure media path that extends through the intermediate stem and the second seal nut, the pressure media path providing fluid communication between the first pressure chamber, and the second pressure chamber of the second actuator housing so that the first plate moves from a first plate-up position towards a first plate-down position in response to the pressure media injected into the injection port, and the second plate moves from a second plate-up position towards a second plate-down position in response to the pressure media injected into the injection port, for actuating the valve;

providing a second outlet port, the second outlet port extending through the second actuator housing outside of the second pressure chamber;

providing a non-Newtonian fluid located within the second actuator housing outside of the pressure chamber; and providing an indicator tube in fluid communication with the second outlet port and located outside of the second actuator, the indicator tube providing a fluid flow path for the non-Newtonian fluid as the second plate moves towards the second plate-down position.

19. The method according to claim 18, wherein the step of injecting the pressure media into the injection port includes injecting the pressure media into the injection port that extends through a cap connected to the cap end of the second actuator housing and opens into the second pressure chamber so that the pressure media passes from the second pressure chamber to the first pressure chamber through the pressure media path to move both the first plate and the second plate and actuate the valve.

20. The method according to claim 18, wherein the step of injecting the pressure media into the injection port includes injecting the pressure media into the injection port that extends through the second actuator housing and opens into the first pressure chamber so that the pressure media passes from the first pressure chamber to the second pressure chamber through the pressure media path to move both the first plate and the second plate and actuate the valve.

* * * * *